Patented Mar. 10, 1942

2,275,843

UNITED STATES PATENT OFFICE 2,275,843

CONDENSATION PRODUCT AND METHOD

Edwin T. Clocker, Bethlehem, Pa.

No Drawing. Application April 28, 1939,
Serial No. 270,651

20 Claims. (Cl. 260—22)

My invention relates to methods of producing an improved condensation product suitable for use in resins, lacquers, paints, varnishes, enamels, plastic masses, and for other similar purposes, and to the new product so produced. This application is a continuation in part of my copending applications, Serial No. 165,898, filed September 27, 1937 for Condensation product and method, Patent No. 2,188,885, and Serial No. 165,900, filed September 27, 1937 for Coating composition and method, Patent No. 2,188,884, since it contains claims divided from said applications. Serial Nos. 165,898 and 165,900 are in turn continuations in part of my copending applications Serial No. 759,086, filed December 24, 1934, Patent No. 2,188,882, and Serial No. 117,243, filed December 22, 1936, Patent No. 2,188,883, both for Condensation product and method. Patent No. 2,188,882, includes the generic claims and certain species relating to the condensation of an acyclic olefinic acid having less than ten carbon atoms in the carbon chain, or its ester, with a nonconjugated unsaturated nonhydroxylated aliphatic acid having from ten to twenty-four carbon atoms in the carbon chain, or a salt or ester thereof. Patent No. 2,188,883 relates particularly to the maleic species. Patent No. 2,188,885 is concerned particularly with soluble salts. Patent No. 2,188,884 is concerned particularly with coating. Serial No. 165,889, filed September 27, 1937, for Condensation product and method, Patent No. 2,188,890, involves the subject matter relating to recondensation.

Serial No. 231,759, filed September 26, 1938, for condensation product and method, Patent No. 2,188,889, is directed to the reaction product of the condensation product with a basic dyestuff. Serial No. 231,760, filed September 26, 1938, for Condensation product and method, Patent No. 2,188,886, is directed to water insoluble metallic salts. Serial No. 231,761, filed Sept. 26, 1938, for Oily dispersion material, Patent No. 2,188,887, relates to oils, fats and waxes emulsified by the condensation product of the invention. Serial No. 235,252, filed October 15, 1938, for Condensation product and method, Patent No. 2,188,888, is directed to condensation with oleic acid and its compounds.

A purpose of my invention is to produce polyhydric alcohol esters of a condensation product resulting from condensation between an acyclic olefinic acid having less than ten carbon atoms in its carbon chain and a nonhydroxylated ester of a nonconjugated unsaturated nonhydroxylated aliphatic acid having from ten to twenty-four carbon atoms in its carbon chain. Any relatively short chain compound containing the ethylene linkage in condensable form may be condensed with any nonconjugated unsaturated nonhydroxylated aliphatic ester or the like having from ten to twenty-four carbon atoms in its carbon chain.

A further purpose is to produce polyhydric alcohol esters of condensation products formed by condensation of a condensable ethylene type acidic compound having less than ten carbon atoms in its carbon chain at the carbon chain of a nonconjugated unsaturated nonhydroxylated fatty ester or the like by suitable application of heat and, desirably, also pressure. A temperature between 150° C. and 300° C. or higher is preferred for the reaction, 180° C. to 260° C. being the most satisfactory range. The reaction will desirably proceed for a time of at least three-quarters of an hour and sufficient to produce substantial condensation. Very good results are obtained using temperatures of at least 150° C. and in excess of the ordinary boiling point of the acyclic olefinic acid with return condensation.

A further purpose is to cause the condensation to take place between one molecular equivalent of condensable ethylene type acidic compound having less than ten carbon atoms in its carbon chain and one molecular equivalent of nonconjugated unsaturated nonhydroxylated carbon chain ester having from ten to twenty-four atoms in the carbon chain.

A further purpose is to produce a polyhydric alcohol ester of an acylic olefinic acid or the like having less than ten carbon atoms in its carbon chain, partially or completely saturating the double bonds of a nonconjugated unsaturated nonhydroxylated, fatty oil or the like.

A further purpose is to condense maleic anhydride or the like with a drying oil such as linseed oil or with drying oil acids such as linseed oil acids and to esterify the condensation product with a polyhydric alcohol.

A further purpose is to produce an acid polyhydric alcohol ester of my novel condensation product, and either to leave the remaining acidic groups unsatisfied, or to cause them to combine with basic materials such as drier metals, basic dyestuffs and other basic compounds.

A further purpose is to cause the acid group of a condensation product of an acyclic olefinic acid or acid anhydride having less than ten carbon atoms in its carbon chain with a nonconjugated unsaturated nonhydroxylated fatty oil or the like having from ten to twenty-four carbon atoms in its carbon chain to react with a polyhydric alcohol.

A further purpose is to cause the condensation product of an acyclic olefinic acid having less than ten carbon atoms in its carbon chain and a nonconjugated unsaturated nonhydroxylated aliphatic ester having from ten to twenty-four carbon atoms in its carbon chain, preferably a drying oil, to combine with a polyhydric alcohol and desirably also to incorporate a resin, suitably heating the ingredients to varnish viscosity and thinning with a suitable solvent to produce a varnish.

A further purpose is to cause cellulose in soluble form, preferably as a cellulose ether (for example ethyl cellulose, methyl cellulose or the like) to combine with the novel acidic condensation product of the present invention to produce an ester of the acidic condensation product. Cellulose is of course a polyhydric alcohol, the ether group being inert throughout the reaction but desirable as rendering the material soluble.

Further purposes appear in the specification and in the claims.

It has been known for some time that maleic anhydride or substances yielding maleic anhydride will condense with carbon chain compounds containing a conjugated system of double bonds. For example, Morrell, Marks and Samuels in British Patent No. 407,957 disclose a condensation of maleic anhydride with tung oil, a conjugated compound.

I have discovered that, under suitable conditions, maleic anhydride and compounds which behave similarly, as discussed below, will react with nonconjugated unsaturated nonhydroxylated fatty oils and similar compounds having from ten to twenty-four carbon atoms in the carbon chain and the condensation product thus obtained may be formed into polyhydric alcohol esters.

To produce the maleic condensation product, the maleic grouping must be present in condensable form, preferably as maleic anhydride. The condensation is of course obtained from any of the compounds which yield maleic anhydride and the like, such as malic acid, fumaric acid, maleic acid, aconitic acid or citric acid, if subjected to the conditions under which maleic anhydride is produced. The production of maleic anhydride from such other acids is well known in the art (Bernthsen, Textbook of Organic Chemistry (1923) pages 250-256). Instead of maleic anhydride, an acid ester of maleic acid, or a substituted maleic acid having less than ten carbon atoms in its carbon chain may be used.

As explained herein, in order to avoid a mere esterification of alcohol groups in the initial reaction, as distinguished from a condensation at the double bond, the oil or similar compound should be nonhydroxylated. Where necessary, precautions should be used to avoid hydroxylation by hydrolysis or otherwise. As well known in the art, in order to prevent or minimize hydrolysis, the reacting components should be reasonably dry, and water formed by decomposition of a reacting ingredient during the reaction should be removed. For example, if maleic acid (as distinguished from the anhydride) is caused to react with an oil or similar compound, it is preferable to use a relatively high temperature to cause rapid reaction, and it is preferable to permit elimination of the water formed by decomposition of the maleic acid into maleic anhydride, as by permitting distillation and avoiding refluxing. Where maleic anhydride or a similar compound not producing water by decomposition is to be used, the desirability cf avoiding refluxing of course ceases.

Wherever reference is made herein to maleic anhydride, it will be understood that I include substances which yield maleic anhydride if subjected to the conditions at which maleic anhydride is produced. I also include substituted maleic acids having less than ten carbon atoms in their carbon chains, and other equivalents.

Wherever I refer herein to an acid or to an acid group, I of course include an acid anhydride and an acid anhydride group, and vice versa. Wherever I refer to an ester, I include also a half ester.

Investigation of a large number of compounds has shown that condensation with an ester of a nonconjugated unsaturated nonhydroxylated aliphatic acid having from ten to twenty-four carbon atoms in the carbon chain is generally characteristic of chain compounds having the ethylene linkage and having less than ten carbon atoms in the carbon chains, which are substituted on one or both sides of the double bond to form acids or acid anhydrides, or half esters thereof, or similar compounds. These compounds are olefinic as they are acyclic and have the ethylene linkage. Such olefinic compounds are monosubstituted when they contain only one acid, acid anhydride or esterified group; for example crotonic acid. Such olefinic compounds are di-substituted when they contain two acid, acid anhydride or esterified groups; for example maleic anhydride, citraconic anhydride, maleic acid, acid methyl maleate.

When an olefinic compound of less than ten carbon atoms in the carbon chain is said to have the ethylene linkage in condensable form, the expression "in condensable form," is intended to indicate that the compound is not a hydrocarbon, for example, but that it is an acid or acid anhydride, or half ester thereof, or a similar compound which will condense with a nonconjugated unsaturated nonhydroxylated fatty acid or the like having from ten to twenty-four carbon atoms in the carbon chain.

The longer the carbon chain of the acyclic olefinic acid or acid anhydride, or half ester thereof, or similar compound, the less vigorous is the condensation reaction. Thus at the upper limit (nine carbon atoms in the carbon chain) the reaction is relatively mild. If there are less than seven carbon atoms in the carbon chain (for example six) the reaction is more vigorous. A still more vigorous reaction is obtained if there are less than five carbon atoms in the carbon chain. In the case of any ester of any olefinic compound, the carbon chain of the olefinic compound should have less than ten carbon atoms, the carbon chain of the compound added by esterification not being counted.

In all cases where I refer in the specification to less than ten carbon atoms in the carbon chain of the acyclic olefinic compound, it will be understood that a more vigorous reaction is obtained with compounds having less than seven carbon atoms in the carbon chain, and a still more vigorous reaction with compounds having less than five carbon atoms in the carbon chain. These latter groups (less than seven and less than five) are to be taken as expressly included, although not specifically mentioned because of a desire to shorten the specification.

It will of course be apparent that an attempt to condense maleic anhydride or the like with an ester of a nonconjugated unsaturated hydroxylated aliphatic acid having from ten to twenty-four carbon atoms in the carbon chain, will result in esterification between the acidic group of maleic anhydride and the hydroxyl group or groups in the ester of the aliphatic acid. Condensation between the maleic anhydride or the like and the carbon chain of the ester of the hydroxylated aliphatic acid, will only take place after esterification is complete, and in case maleic anhydride or the like in excess of that consumed by the esterification is present in contact with the ester of the hydroxylated aliphatic acid under the proper conditions.

The esterification of course produces a change in properties, and the condensation product of an ester of a hydroxylated aliphatic acid can in general be given properties comparable with those of the condensation product of an ester of a nonhydroxylated aliphatic acid, only by destroying the esterification of the maleic anhydride or the like, as by hydrolysis.

Due to the difficulty in obtaining a condensation reaction between maleic anhydride or the like and an ester of a nonconjugated unsaturated hydroxylated aliphatic acid having from ten to twenty-four carbon atoms in the carbon chain, due to the change in properties caused by esterification, and due to the difficulty of decomposing the ester, the claims have generally been drawn to exclude hydroxylated aliphatic esters. This means that such esters are not sufficiently hydroxylated to interfere with the condensation by esterification. Oils which are polymerized by blowing with air are usually hydroxylated.

In those cases where the claims do not exclude hydroxylated aliphatic esters, it will be understood that more than mere esterification at the hydroxyl group is intended—there should be condensation at a point of unsaturation on the carbon chain of the ester.

When reference is made to the maleic grouping in condensable form, it will be understood that it is intended to designate maleic anhydride, a substance yielding maleic anhydride or a similar compound which is capable of condensing to enter the carbon chain of a nonconjugated unsaturated nonhydroxylated aliphatic compound having from ten to twenty-four carbon atoms in the carbon chain. A maleic condensation product may be obtained from any such compound having the maleic grouping, preferably maleic anhydride.

As will later be explained in considerable detail, the presence of the acid or acid anhydride radical in the condensation product is distinctly advantageous, because of the reactions of which the acid or acid anhydride radical is capable and the uses to which such reactions may be put.

A wide variety of nonconjugated unsaturated nonhydroxylated carbon chain compounds having from ten to twenty-four carbon atoms in the carbon chain may be employed. Esters of fatty acids with mono-, di- or poly-hydric alcohols, for example glyceryl or glycol esters, are particularly desirable.

Where reference is made to the length of the carbon chain as being from ten to twenty-four carbon atoms, it is intended to include compounds having ten carbon atoms, twenty-four carbon atoms or any intermediate number of carbon atoms in the chain. The reference to the length of the carbon chain applies to the carbon chain of the acid. A glyceride, for example, contains three such carbon chains united to a glyceryl group.

As examples of the type of nonconjugated unsaturated nonhydroxylated aliphatic acids having from ten to twenty-four carbon atoms in the carbon chain whose esters I may use, I suggest oleic, linoleic, linolenic, clupanodonic and undecylenic. The esters of the nonhydroxylated fatty acids may be either glyceryl esters, which form oils such as corn, olive, cotton seed, peanut, linseed, sunflower, safflower, perilla, hemp seed, walnut seed, soya bean, rape seed, tomato seed, neat's-foot, lard, codliver, cod, burbet, salmon, menhaden, and many others, all nonconjugated unsaturated nonhydroxylated fatty oils; or esters of other alcohols, for example glycol esters. It will furthermore be understood that esters of mixtures of various fatty acids, or of various esters, or of the esters and the free fatty acids, may be employed if desired The oils above referred to may generally be described as oils predominantly consisting of glycerides of linoleic and oleic acids.

When I refer to the grouping of a nonconjugated unsaturated nonhydroxylated aliphatic acid having from ten to twenty-four carbon atoms in the carbon chain, I mean to include the esters of the acid, whether with mono-, di- or poly-hydric-alcohols. I do not include herein hydroxylated aliphatic oils, etc., because, while the condensation of my invention may in certain cases be obtained with them, special precautions must be taken because of the tendency of hydroxylated fatty oils, etc., to esterify and gel. Typical hydroxylated fatty oils are castor oil and cashew nut shell oil.

In the condensation, I may desirably employ one molecular equivalent of nonconjugated unsaturated nonhydroxylated aliphatic ester or the like to one molecular equivalent of acyclic olefinic acid and subject the mixture to a temperature of between 150° C. and 300° C. (more desirably between 180° C. and 260° C.) and preferably also to high pressure to facilitate the reaction. The temperature may in some cases be somewhat above 300° C. if the reacting components can stand such high temperature. The reaction will desirably proceed for a time of at least three-quarters of an hour and sufficient to produce substantial condensation. Very good results are obtained using temperatures of at least 150° C. and in excess of the ordinary boiling point of the acyclic olefinic acid with return condensation. Pressure may desirably be applied by simply confining the reaction components between the walls of some vessel such as a pressure autoclave and then heating the reaction components. Pressure may also be applied in any other suitable way, as by pumping the reaction components into the vessel or introducing an inert gas under pressure. I have used pressures up to 300 pounds per square inch with success. Of course the desirable pressure will vary with the individual reaction. When I refer herein to reaction under return condensation I mean to include not only reaction in the confining walls of a pressure autoclave as in Example 1 but also under reflux as in Example 2.

A suitable catalyst may be used to accelerate the reaction and to increase the yield. I do not, however, find that a catalyst is necessary.

The condensation reaction may be carried out in the presence of suitable solvents, although this is not usually necessary.

In ordinary practice I prefer not to use sufficient acyclic olefinic acid having less than ten carbon atoms in the carbon chain, to saturate all of the double bonds in the fatty oil, etc., having from ten to twenty-four carbon atoms in the carbon chain. The condensation product thus ordinarily has an iodine value. Generally it is sufficient to saturate one-sixth to one-third of the double bonds in the fatty oil, etc. Thus in olive oil one-third of the double bonds (one) is ordinarily saturated, and in linseed oil one-sixth (one). But in individual cases it may be desirable to saturate more ethylene linkages in the fatty oil, and even to completely saturate them. To saturate all of the ethylene linkages in linseed oil, six molecular equivalents of olefinic compound having less than ten carbon atoms in the carbon chain are caused to react with one molecular equivalent of linseed oil.

Examples 1 to 4 given below, clearly indicate the way in which my initial condensation product is obtained:

EXAMPLE 1

In a pressure autoclave, 180 parts by weight of alkali-refined linseed oil are mixed with 20 parts by weight of maleic anhydride. The temperature is maintained at from 230° C. to 260° C. for one hour, a pressure of about 30 pounds per square inch developing. The reaction may be obtained satisfactorily at 150° C., but is much slower at this low temperature, and the temperature may be raised to as much as 300° C. or even somewhat higher, but a high temperature may cause some difficulty due to carbonization. After cooling, the reaction product is removed from the autoclave. The condensation product is slightly darker and more viscous than the original linseed oil. It is soluble in acetone, ethyl acetate, ether, xylene, carbon tetrachloride, higher petroleum hydrocarbons and turpentine; and semi-soluble in 95% ethyl alcohol. The condensation product is miscible with fatty oils and solutions of cellulose derivatives such as nitrocellulose in all proportions. The iodine value is 141.4, as against 190.0 for the original linseed oil. The saponification value is 288 and the acid value is 52.9, in the presence of ethyl alcohol.

EXAMPLE 2

To 180 parts by weight of linseed oil are added 25 parts by weight of citraconic anhydride (an alkyl-substituted maleic anhydride) and the mixture is heated in a three-neck flask, equipped with a reflux condenser, at about 250° C. for about three-quarters of an hour. At the end of this period, no further citraconic anhydride appears to condense under the reflux, indicating completion of the reaction. As a precaution, heating is continued for about 15 minutes longer. The reaction product is less viscous than the maleic condensation product of linseed oil obtained in Example 1, but has the same properties otherwise.

EXAMPLE 3

A mixture of 25 parts by weight of linseed oil and 2.4 parts by weight of crotonic acid (an acyclic olefinic acid) are heated under pressure at about 250° C. for about two hours. The condensation product has similar properties to the maleic-linseed oil condensation product obtained in Example 1 as respects solubility above noted, and dispersing power, drying action and adherence to metals, noted below.

EXAMPLE 4

A mixture of 900 parts by weight of linseed oil and 112 parts by weight of acid methyl maleate (a maleic half ester) are heated under pressure at about 250° C. for about 2 hours. The condensation product, although less acidic than the product of Examples 1 to 2, may be esterified with polyhydric alcohols to produce a resin as in the case of the condensation products of the other examples.

My novel condensation product may be made with nonconjugated unsaturated nonhydroxylated drying, semidrying or nondrying fatty oils having from ten to twenty-four carbon atoms in the carbon chain, or mixtures of the same, and the characteristics of the product are, to some extent, dependent upon the character of the oils or the like employed in the reaction. For convenience, the group of semidrying oils is classed with the group of drying oils in the claims, so that a claim for a drying oil will include a semidrying oil. When nonconjugated unsaturated nonhydroxylated drying oils are caused to react with maleic anhydride or the like, the products dry in the air at ordinary temperatures to form hard dry films whether or not driers are used. Likewise, the condensation products of nonconjugated unsaturated nonhydroxylated drying oils generally exhibit thermo-hardening properties, being convertible at 70° C. to 80° C., for example into hard resistant varnish-like films in short periods of time. Where nonconjugated unsaturated nonhydroxylated semidrying oils such as sunflower, soya, safflower, and other similar oils are caused to react with maleic anhydride or the like, the condensation products do not dry so readily as the condensation products obtained from the drying oils. An example of the drying behavior of the condensation product obtained by Example 1 is as follows:

EXAMPLE 5

A 1:1 xylene solution of the reaction product obtained in Example 1 to which soluble driers are added to the extent of 0.03% of cobalt, 0.05% of manganese and 0.5% of lead, for example in the form of linoleates or resinates, dries to a hard film at room temperature in about five hours and may be stoved to a hard film at 80° C. in about one and one-half hours. The film produced is not acted upon by water, ethyl alcohol, benzine, or xylene.

Without limiting myself to any exact structure for the condensation product, it would appear that the condensation product is an addition product at a double bond in the carbon chain of the nonconjugated unsaturated nonhydroxylated fatty ester or the like to the condensable olefinic compound or the like. For example, if linolenic ester reacts with maleic anhydride, the first stage in the reaction appears to be in general as follows (the acid only being shown and not the glyceride). Of course if enough maleic anhydride be present, the same reaction will take place at each double bond in the linolenic ester.

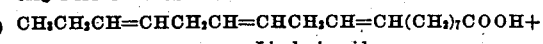
Linolenic acid

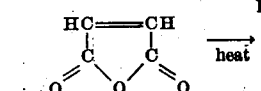
Maleic anhydride

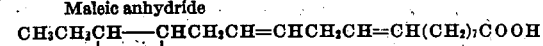

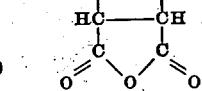
Maleic condensation product of linolenic acid

It will, of course, be evident that three of these fatty acid chains will be combined to the glyceryl radical in each molecule of oil.

The iodine value of the condensation product confirms the above formula, and indicates that the ethylene linkage of the olefinic compound (in this case maleic anhydride) has been lost during condensation. It should be noted that one of the double bonds in the linolenic acid chain and the ethylene linkage in maleic anhydride appear to have disappeared in the condensation product forming a ring type compound with four carbon atoms in the ring.

The condensation product appears to be characterized by the linkage:

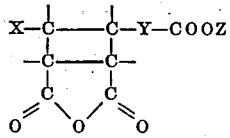

where X and Y are carbon chains without conjugated double bonds and Z is a hydrogen atom, a metal or an ester group.

The reaction above will be modified in well known manner if the ester of some other nonconjugated unsaturated nonhydroxylated aliphatic acid having between ten and twenty-four carbon atoms in the carbon chain be employed or if some other olefinic acid having less than ten carbon atoms in its carbon chain, be used instead of or in mixture with maleic anhydride.

When maleic acid or a substance yielding maleic acid is condensed with a nonconjugated unsaturated nonhydroxylated fatty oil or the like, it appears to change to maleic anhydride and the maleic anhydride condensation product results.

Esters

Esterification of the acid group is frequently desirable. The alcohol used may be either aliphatic or aromatic and either mono- or polyhydric. Where the term "poly-hydric" is used, di-hydric is included, so that glycol is a poly-hydric alcohol just as much as glycerine or cellulose.

Due to their ability to form esters of high molecular weight, esterification with poly-hydric alcohols is particularly desirable, and this subject matter is accordingly being stressed in the present application. The esters of the condensation product with poly-hydric alcohols have interesting and unusual properties as noted below. The poly-hydric alcohol ester of the condensation product of maleic anhydride or the like with a nonconjugated unsaturated nonhydroxylated fatty drying oil exhibits the same desirable air-drying and thermo-hardening properties as the unesterified condensation product, and may be used for paint, varnish and lacquer work with success.

The following example describes the preparation of the glycol ester of the acyclic olefinic acid fatty oil condensation product.

Example 6

A typical case of esterification is exhibited when 25 parts by weight of the viscous oil obtained by the interaction of maleic anhydride and linseed oil, as described for instance in Example 1, are mixed with 1.6 parts by weight of ethylene glycol and the mixture is maintained at about 180° C. until the reaction ceases. A 1:1 xylene solution of the reaction product, when treated with a suitable quantity of metallic driers, as described for instance in Example 5, dries at room temperature to a hard film in a somewhat shorter time than that required for linseed oil and, when stoved at 80° C., gives a hard film in about one and one-half hours. The film is not attacked by water, alcohol or xylene.

In Example 6 the esterification is all at the acidic groups of the maleic anhydride.

Glycerine may very desirably be employed for esterifying the condensation product of the present invention, and very desirable varnish resins having useful drying properties may be manufactured by esterifying with glycerine. The acid number will desirably be reduced to about 20 to 30 by the glycerine esterification. The resulting product has solvent properties and may be incorporated with other resins, such as rosin. This mixture may be heated to the required varnish viscosity and then thinned with a common organic solvent such as a benzene hydrocarbon (benzene, toluene, xylene, etc.) or butyl alcohol. These results may be obtained by esterifying the condensation product of a nonconjugated unsaturated nonhydroxylated drying oil or the drying oil acids.

Example 7

Heat together 100 parts by weight of the maleic anhydride condensation product of linseed oil as obtained in Example 1, and 11 parts by weight of glycerine at 230° C. until a drop of the reaction mixture remains clear on cold metal. Then add to the reaction mixture 60 parts by weight of wood rosin and heat at 285° C. for 45 minutes. The product gives an acid number of 25 as compared with 113 for the acid number of the uncondensed mixture.

This product, when cut with petroleum spirits containing drier, dries to a hard, water-resistant film.

Other suitable poly-hydric alcohols aside from glycol and glycerine may be employed for esterification. Cellulose is an example of such a poly-hydric alcohol. Ordinary cellulose is not soluble and for that reason does not react, but when cellulose is solubilized as by forming cellulose ether (ethyl cellulose or methyl cellulose, etc.) it reacts as in the case of the other poly-hydric alcohols forming an ester with the condensation product of the present invention. The ether group appears merely to render the cellulose soluble, and apparently has nothing to do with the reaction which takes place at the hydroxyl groups.

Example 8

Up to 20% of ethyl cellulose is dissolved in the maleic anhydride condensation product of linseed oil at about 220° C. A reaction occurs accompanied by the splitting off of water. The reaction product is desirable as a metal coating, drying to a tough hard film of high gloss, very high transparency and great water resistance.

Other soluble forms of cellulose may be employed providing they will melt without decomposition below about 300° C. Cellulose acetate does not melt at a low enough temperature to give the above reaction conveniently and cellulose nitrate decomposes at the temperature required. In the case of these materials solvents must be employed in order to obtain esterification.

There is a class of poly-hydric alcohols which are also ethers. Typical examples of such poly-hydric alcohols containing ether groups are ethylene glycol monoethyl ether (Cellosolve), diethylene glycol monoethyl ether (Carbitol), and the methyl, butyl, etc., ethers of the same.

Example 9

A mixture of 100 grams of the maleic anhydride condensation product of linseed oil obtained in Example 1 and 10 grams of ethylene glycol monoethyl ether is heated to 180° C. and maintained at that temperature until the reaction ceases. The resulting product is desirably used as an ingredient of emulsions.

Throughout the specification and claims, where I refer to nonhydroxylated esters of nonconjugated unsaturated nonhydroxylated aliphatic acids having from ten to twenty-four carbon atoms in the carbon chain, I mean such esters as are unoxidized or nonpolymerized or not sufficiently oxidized or polymerized to interfere with the reactions disclosed herein. Thus, in referring to linseed oil, I mean the product generally known as such, raw or refined, and not linseed oil sufficiently oxidized or polymerized to prevent or seriously interfere with the formation of a condensation product at a double bond.

Many of the fish oils contain varying percentages of fatty alcohols, which will of course react with maleic anhydride to form esters. The esterified fatty alcohols may be allowed to remain in the condensation product, or the alcohols may be removed before condensation takes place.

It will be evident that the condensation product of my invention may be oxidized subsequent to condensation.

Where reference is made to poly-hydric alcohols, it is intended to include di-hydric alcohols. Reference to acids is intended to include acid anhydrides and half esters of acids. Reference to esters is intended to include partially completed esters such as half esters.

It will be understood that the condensation of minute amounts of the olefinic compound with the nonconjugated unsaturated nonhydroxylated fatty compound will not appreciably change the character of the latter. In general, at least 1% (based on the weight of the condensation product) of the olefinic compound should be combined with the nonconjugated unsaturated nonhydroxylated fatty compound in the product to insure a distinctive character of the product.

In view of my invention and disclosure variations and modifications to meet individual whim or particular need will doubtless become evident to others skilled in the art, to obtain all or part of the benefits of my invention without copying the exact process or product described.

Having thus described my invention, what I claim as new and desire to secure by Letters Patent is:

1. The process of forming a condensation product which comprises reacting an acyclic olefinic acid having less than ten carbon atoms in the carbon chain with the carbon chain of an oil predominantly consisting of glycerides of linoleic and oleic acids at a temperature in excess of 150° C. and for a time of at least three-quarters of an hour, the reaction being substantially wholly between the acyclic olefinic acid and the oil, and esterifying the acidic condensation product with a poly-hydric alcohol.

2. The process of producing a resin or the like, which comprises reacting an acyclic olefinic acid having less than ten carbon atoms in its carbon chain with a nonconjugated unsaturated nonhydroxylated fatty oil having from ten to twenty-four carbon atoms in the carbon chains of the fatty acids at a temperature above the ordinary boiling point of the acyclic olefinic acid with return condensation the reaction being substantially wholly between the acyclic olefinic acid and the oil, and esterifying the acidic reaction product with a poly-hydric alcohol.

3. The process of producing a resin or the like, which comprises condensing maleic anhydride with an oil predominantly consisting of glycerides of linoleic and oleic acids at a temperature in excess of 150° C. and for a time of at least three-quarters of an hour, the reaction being substantially wholly between the anhydride and the oil, and esterifying the acidic condensation product with a poly-hydric alcohol.

4. The process of producing a resin or the like, which comprises reacting maleic anhydride with an oil predominantly consisting of glycerides of linoleic and oleic acids at a temperature above the ordinary boiling point of maleic anhydride the reaction being substantially wholly between the maleic anhydride and the oil, and esterifying the acidic reaction product with a poly-hydric alcohol.

5. The process of producing a resin or the like, which comprises condensing an acyclic olefinic acid having less than ten carbon atoms in its carbon chain at a point of unsaturation in the carbon chain of a nonconjugated unsaturated nonhydroxylated drying oil having from ten to twenty-four carbon atoms in the carbon chains of the fatty acids of the oil, at a temperature in excess of 150° C. and for a time of at least three-quarters of an hour, the reaction being substantially wholly between the acyclic olefinic acid and the oil, and esterifying the acidic condensation product with a poly-hydric alcohol.

6. The process of producing a resin or the like, which comprises condensing an acyclic olefinic acid having less than ten carbon atoms in the carbon chain with a nonconjugated unsaturated nonhydroxylated fatty oil having from ten to twenty-four carbon atoms in the carbon chain of the fatty acids of the oil, at a temperature in excess of 150° C. and for a time of at least three-quarters of an hour, the reaction being substantially wholly between the acyclic olefinic acid and the oil, and esterifying the acidic condensation product with glycerine.

7. The process of producing a resin or the like, which comprises condensing maleic anhydride with linseed oil, at a temperature in excess of 150° C. and for a time of at least three-quarters of an hour, the reaction being substantially wholly between the maleic anhydride and the oil, and esterifying the acidic condensation product with cellulose ether.

8. The process of producing a resin or the like, which comprises condensing an acyclic olefinic acid having less than ten carbon atoms in the carbon chain with a nonconjugated unsaturated nonhydroxylated fatty oil having from ten to twenty-four carbon atoms in the carbon chain of the fatty acids of the oil, at a temperature in excess of 150° C. and for a time of at least three-quarters of an hour, the reaction being substantially wholly between the acyclic olefinic acid and the oil, and esterifying the acidic condensation product with a cellulose ether.

9. The process of producing a resin or the like, which comprises condensing an acyclic olefinic acid having less than ten carbon atoms in the carbon chain with a nonconjugated unsaturated nonhydroxylated fatty oil having from ten to twenty-four carbon atoms in the carbon chain of the fatty acids of the oil, at a temperature in excess of 150° C. and for a time of at least three-quarters of an hour, the reaction being substantially wholly between the acyclic olefinic acid and the oil, and esterifying the acidic condensation product with a poly-hydric alcohol containing an ether group.

10. A condensation product consisting of a nonconjugated unsaturated nonhydroxylated fatty oil having from ten to twenty-four carbon atoms in the carbon chains of the fatty acids of the oil, an acyclic olefinic acid having less than ten carbon atoms in its carbon chain, said acyclic olefinic acid at an intermediate point in its carbon chain being attached to an intermediate point in a carbon chain of a fatty acid of the oil, with the acidic groups of the acyclic olefinic acid not satisfied by the oil, and a poly-hydric alcohol combined with an acidic group of the acyclic olefinic acid.

11. A condensation product consisting of an oil predominantly composed of glycerides of linoleic and oleic acids, an acyclic olefinic acid having less than ten carbon atoms in its carbon chain, said acyclic olefinic acid at an intermediate point in its carbon chain being attached to an intermediate point in a carbon chain of a fatty acid of the oil, with the acidic groups of the acyclic olefinic acid not satisfied by the oil, and a poly-hydric alcohol combined with an acidic group of the acyclic olefinic acid.

12. A condensation product consisting of an oil predominantly composed of glycerides of linoleic and oleic acids, maleic anhydride which at an intermediate point in its carbon chain is attached to an intermediate point in a carbon chain of a fatty acid of the oil, with the acidic groups of the maleic anhydride not satisfied by the oil, and a poly-hydric alcohol combined with an acidic group of the maleic anhydride.

13. A condensation product consisting of an oil predominantly composed of glycerides of linoleic and oleic acids, maleic anhydride which at an intermediate point in its carbon chain is attached to an intermediate point in a carbon chain of a fatty acid of the oil, with the acidic groups of the maleic anhydride not satisfied by the oil, and cellulose ether combined with an acidic group of the maleic anhydride.

14. A condensation product consisting of a non-conjugated unsaturated non-hydroxylated drying oil having from ten to twenty-four atoms in the carbon chain of the fatty acids of the oil, an acyclic olefinic acid having less than ten carbon atoms in its carbon chain, said acyclic olefinic acid at an intermediate point in its carbon chain being attached to an intermediate point in a carbon chain of a fatty acid of the oil, with the acidic groups of the acyclic olefinic acid not satisfied by the oil, and a poly-hydric alcohol combined with an acidic group of the acyclic olefinic acid.

15. A condensation product consisting of a non-conjugated unsaturated non-hydroxylated fatty oil having from ten to twenty-four carbon atoms in the carbon chain of the fatty acids of the oil, an acyclic olefinic acid having less than ten carbon atoms in its carbon chain, said acyclic olefinic acid at an intermediate point in its carbon chain being attached to an intermediate point in a carbon chain of a fatty acid of the oil, with the acidic groups of the acyclic olefinic acid not satisfied by the oil, and glycerine combined with an acidic group of the acyclic olefinic acid.

16. A condensation product consisting of a non-conjugated unsaturated non-hydroxylated fatty oil having from ten to twenty-four carbon atoms in the carbon chain of the fatty acids of the oil, an acyclic olefinic acid having less than ten carbon atoms in its carbon chain, said acyclic olefinic acid at an intermediate point in its carbon chain being attached to an intermediate point in a carbon chain of a fatty acid of the oil, with the acidic groups of the acyclic olefinic acid not satisfied by the oil, and cellulose ether combined with an acidic group of the acyclic olefinic acid.

17. A condensation product consisting of a non-conjugated unsaturated non-hydroxylated fatty oil having from ten to twenty-four carbon atoms in the carbon chain of the fatty acids of the oil, an acyclic olefinic acid having less than ten carbon atoms in its carbon chain, said acyclic olefinic acid at an intermediate point in its carbon chain being attached to an intermediate point in a carbon chain of a fatty acid of the oil, with the acidic groups of the acyclic olefinic acid not satisfied by the oil, and a poly-hydric alcohol containing an ether group combined with an acidic group of the acyclic olefinic acid.

18. A condensation product consisting of linseed oil, an acyclic olefinic acid having less than ten carbon atoms in its carbon chain, said acyclic olefinic acid at an intermediate point in its carbon chain being attached to an intermediate point in a carbon chain of a fatty acid of the oil, with the acidic groups of the acyclic olefinic acid not satisfied by the oil, and a poly-hydric alcohol combined with an acidic group of the acyclic olefinic acid.

19. A condensation product consisting of linseed oil, maleic anhydride which at an intermediate point in its carbon chain is attached to an intermediate point in a carbon chain of a fatty acid of the oil, with the acidic groups of the maleic anhydride not satisfied by the oil, and glycerine combined with an acidic group of the maleic anhydride.

20. A varnish or the like comprising a condensation product consisting of a drying oil predominantly composed of glycerides of linoleic and oleic acids, an acyclic olefinic acid having less than ten carbon atoms in its carbon chain, said acyclic olefinic acid at an intermediate point in its carbon chain being attached to an intermediate point in a carbon chain of a fatty acid of the oil, with the acidic groups of the acyclic olefinic acid not satisfied by the oil, and a poly-hydric alcohol combined with an acidic group of the acyclic olefinic acid.

EDWIN T. CLOCKER.